United States Patent
Scerbo

[15] 3,666,036
[45] May 30, 1972

[54] TRAILING ROAD ARM SYSTEM

[72] Inventor: Joseph Ernest Scerbo, 710 Pinehurst Rd., York, Pa. 17402

[22] Filed: May 18, 1970

[21] Appl. No.: 38,343

[52] U.S. Cl. .............................180/43 R, 115/1, 180/24.09, 180/41, 180/45, 180/75, 280/91, 280/96.2 R
[51] Int. Cl. ....................................B60k 17/30, B62d 61/10
[58] Field of Search ................180/43, 43 A, 43 B, 43 C, 45, 180/46, 47, 48; 280/96, 93

[56] References Cited

UNITED STATES PATENTS

| | | | |
|---|---|---|---|
| 1,901,276 | 3/1933 | Adams | 180/45 UX |
| 2,376,419 | 5/1945 | Cole | 180/43 A |
| 2,894,592 | 7/1959 | Ordorica | 180/45 |

Primary Examiner—A. Harry Levy
Attorney—George W. Price and Barry H. Fishkin

[57] ABSTRACT

In a vehicle a road arm mounted adjacent one end thereof for pivotal movement, means for mounting a wheel adjacent the other end of said road arm, means for steering said wheel about a generally vertical axis, and means for maintaining said axis in a constant attitude as the road arm is pivoted.

5 Claims, 7 Drawing Figures

Patented May 30, 1972

INVENTOR.
JOSEPH E. SCERBO
BY
ATTORNEY

INVENTOR
JOSEPH E. SCERBO
BY
ATTORNEY

Patented May 30, 1972

INVENTOR
JOSEPH E. SCERBO

BY

ATTORNEY

3,666,036

TRAILING ROAD ARM SYSTEM

BACKGROUND

This invention relates to off the road vehicles and more particularly to such vehicles having trailing road arms.

In many instances it is desired to traverse unpaved and rugged terrain at a fairly high speed, both for recreational and industrial purposes. Many of the all terrain vehicles produced for the recreational field to date have been of the light fiberglass type having large balloon tires and powered by small two cycle engines. Obviously, these vehicles are unsuited for rapid movement, load hauling, and generally heavier uses. On the other hand, vehicles suitable for heavy use in off the road terrain are unsuitable for recreational purposes. And, both types are not usable on paved highways where a steady high speed capability is necessary.

The trailing road arm type vehicle has been recognized as a solution to an off the road high velocity and heavy load carrying vehicle since the height and attitude of the vehicle with respect to the ground can be varied to suit the terrain being traversed and the speed desired.

However, in the past such vehicles have been highly complex, with separately mounted systems for powering the wheels, steering the wheels and rotating the road arms. This has precluded this type of vehicle as a viable alternative in the off the road market.

SUMMARY

It is, accordingly, an object of this invention to provide an improved vehicle utilizing a trailing road arm suspension system.

It is a further object of this invention to provide a trailing road arm for a vehicle that is adjustable in static position, steerable and can transmit power.

It is a still further object of this invention to provide a king pin alignment system for a steerable road arm.

In accordance with these and other objects, apparatus according to the invention may comprise, in a vehicle, a road arm mounted adjacent one end thereof for pivotal movement, means for mounting a wheel at the other end of said road arm, means for steering said wheel about a generally vertical axis, and means for maintaining said axis in a constant attitude as the road arm is pivoted.

DESCRIPTION OF THE PREFERRED EMBODIMENT

With reference to the drawings a mobile, all speed, all terrain vehicle is disclosed in a 6 × 6 configuration wherein heavy duty loads may be transported over various types of rough terrain at slow speeds and over paved highways at turnpike speeds.

The vehicle shown is a six wheel drive vehicle in that all six wheels are powered. The front two wheels are steerable to provide maneuverability. However, it should be understood that the invention disclosed herein may be applied to a wide variety of vehicle configurations of different number wheels wherein all or some of the wheels may be powered and all or some of the wheels may be steerable.

For recreational purposes, other configurations would be called for, for example a 4 × 4 unit, with all wheels powered and the front wheels steerable. These can be easily adapted from a 6 × 6 configuration shown by deleting the power transmission connection to the rearmost pair of wheels.

Figure 1:
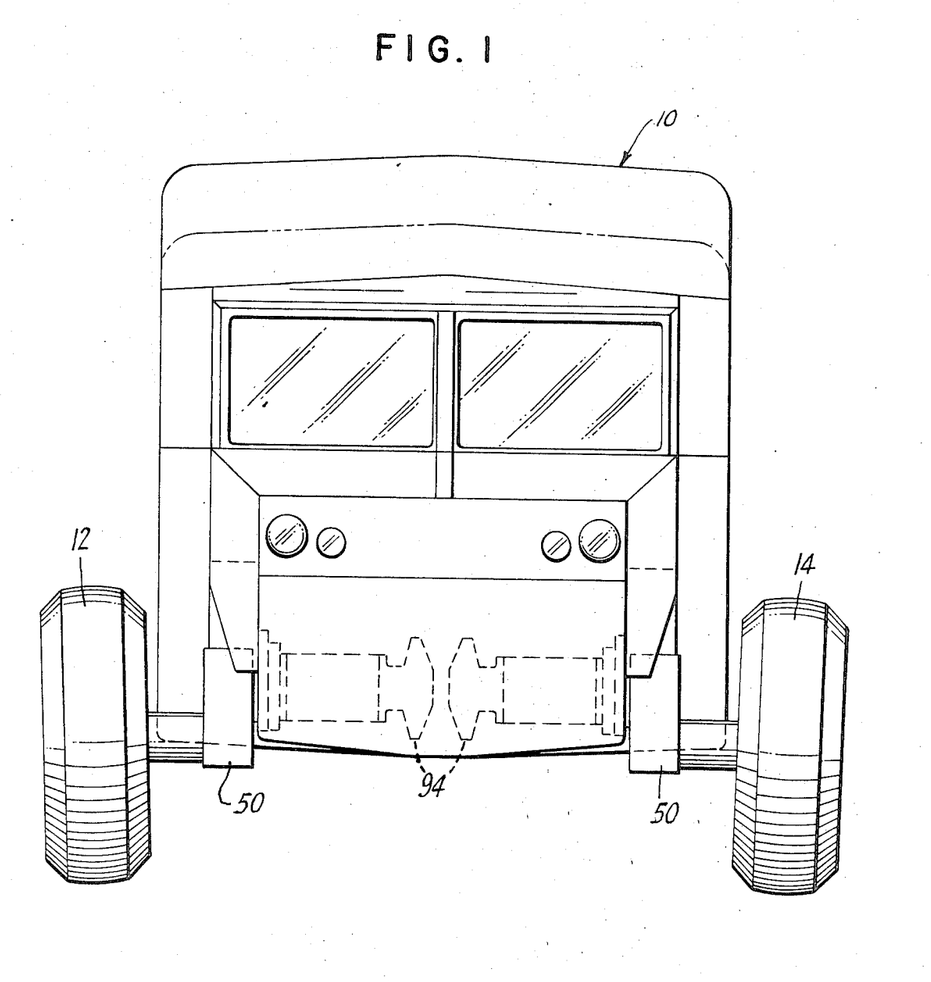
FIG. 1 is a front view of a vehicle including the invention.
Figure 2:
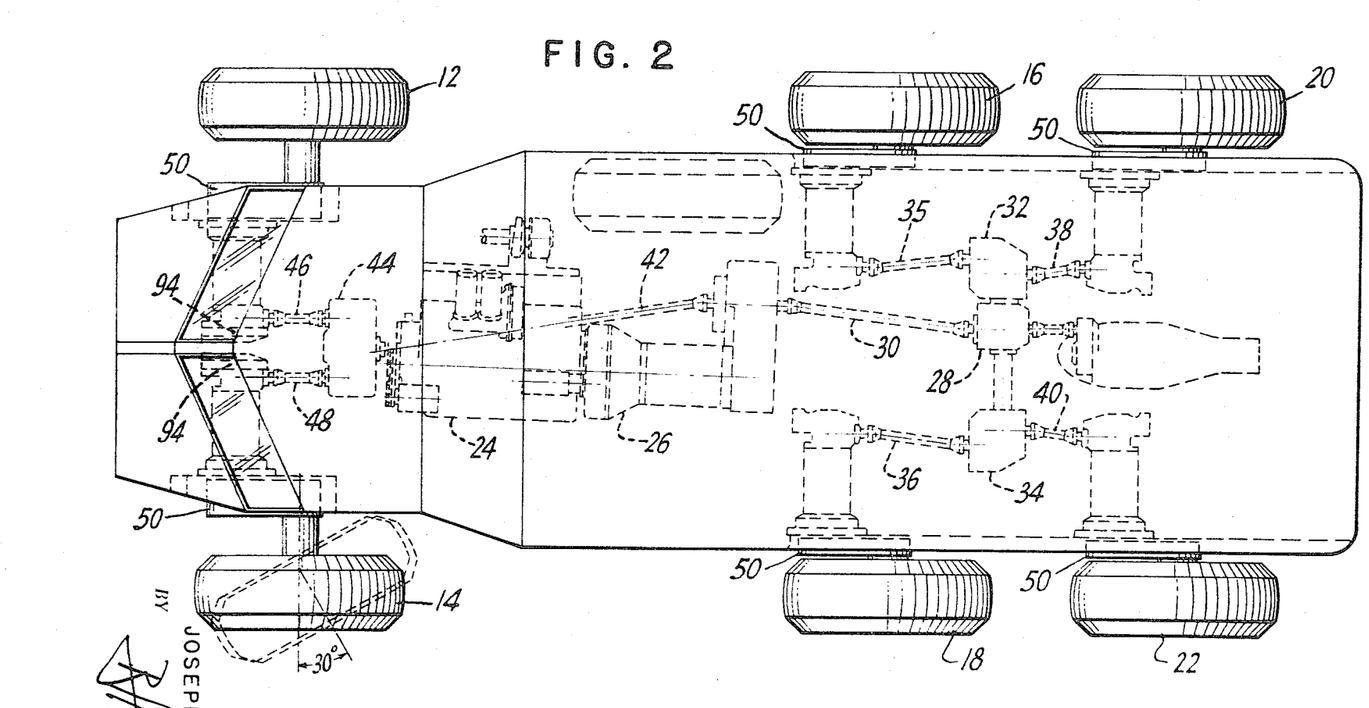
FIG. 2 is a plan view of the vehicle shown in FIG. 1.
Figure 3:
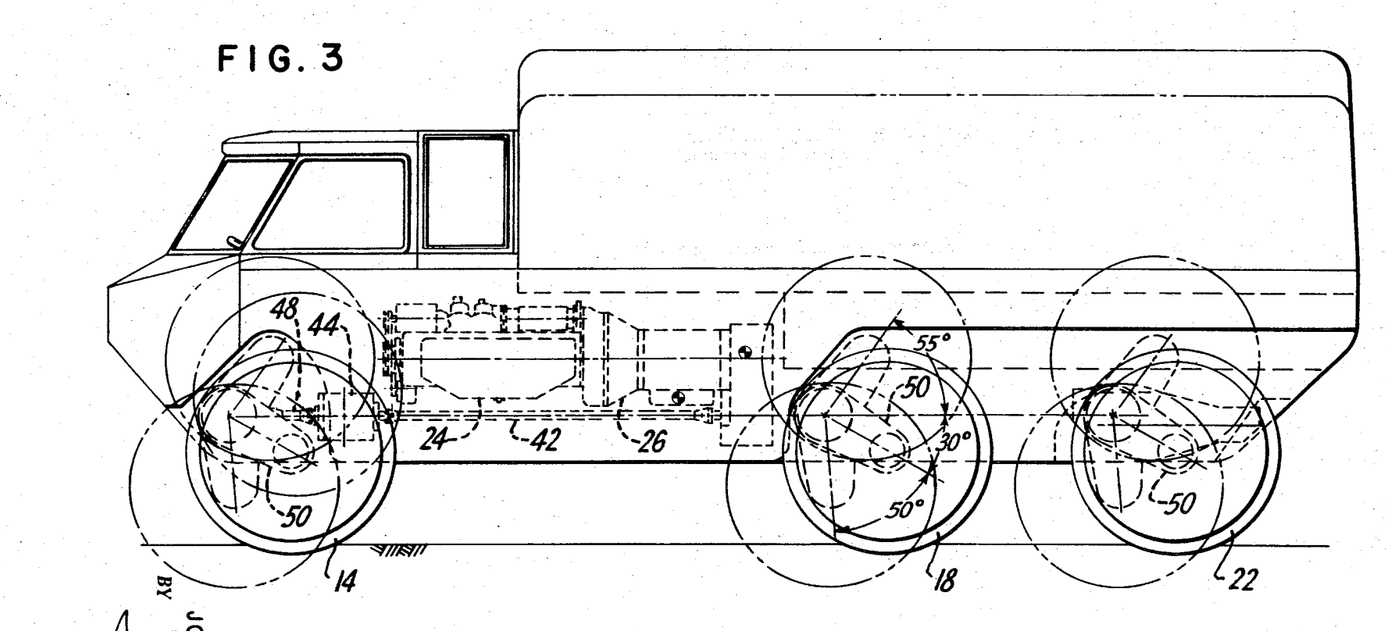
FIG. 3 is a side view of the vehicle shown in FIGS. 1 and 2 showing the pivotal nature of the road arms.

Referring now to FIGS. 1–3, a vehicle 10 according to the invention is shown including front wheels 12 and 14 and a double set of rear wheels, designated 16 and 18 and 20 and 22. The vehicle is powered by a motor 24 mounted adjacent the front of the vehicle.

A transmission 26 transmits motive power from the motor 24 to a transverse differential 28 through a drive shaft 30. A pair of longitudinal differentials, 32 and 34, are connected to the transverse differential 28 and transmit power to the rear wheels 16, 18, 20 and 22 through drive shafts 35, 36, 38 and 40 respectively. A shaft 42 connects the transmission 26 to a differential means 44 mounted adjacent the front of the vehicle. Drive shafts 46 and 48 power front wheels 12 and 14 respectively.

Each of the wheels is mounted on a trailing road arm assembly 50 which includes a first, lower, axis 52 about which the wheel rotates and a second, upper, axis 54 about which the road arm rotates. A suspension 56 is mounted to the road arm assembly as by bolts 58 and is concentric with the road arm second axis 54. The suspension 56 is mounted to the vehicle side wall as by bolts 60 and provides for a limited, biased, rotation of the road arm in both directions in response to the encountering of obstacles by the wheels.

Figure 4:
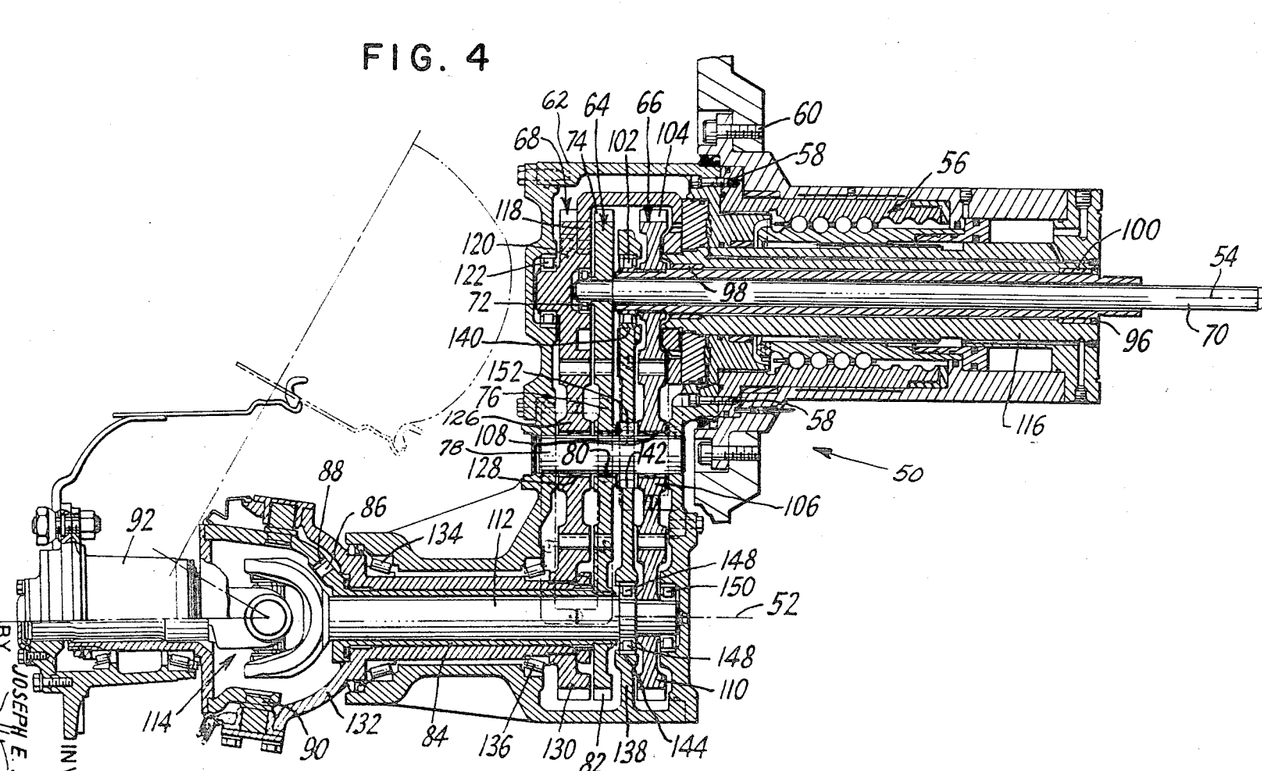
FIG. 4 is a side sectional elevation view of a steerable powered trailing road arm.

The road arm assembly 50 shown in FIG. 4 is for the front wheels 12 and 14 and includes a housing 62, a steering assembly 64, a power transmission assembly 66 and a king pin alignment assembly 68 for maintaining the attitude of the king pin constant as the road arm is rotated about axis 54.

The steering assembly 64 includes a shaft 70 mounted concentrically with road arm assembly upper axis 54 and connected through various linkages to the vehicle steering wheel. The shaft 70 is supported for rotation by a bearing assembly 72. An upper steering gear 74 is mounted on shaft 70 adjacent the bearing assembly 72. Upper gear 74 meshes with a middle steering gear 76 that is rotatably mounted on a stub shaft 78. The stub shaft 78 is fixedly mounted in the road arm housing about half way between the upper and lower axes of the road arm assembly and in parallel spaced relationship therewith. Middle steering gear 76 is mounted for rotation on stub shaft 78 by a bearing 80.

The middle steering gear 76 also meshes with a lower steering gear 82 that is affixed to a steering sleeve 84 mounted concentrically with the road arm assembly lower axis 52. The distal end of steering sleeve 84 is provided with a set of gear teeth 86 that mesh with a complementary set of gear teeth 88 mounted on a king pin steering unit 90. The hub 92 of the wheel 12 or 14 is connected to king pin unit 90 and rotation of the latter turns the wheel.

Thus, rotation of steering shaft 70 in a first direction rotates upper steering gear 74, which counter-rotates middle steering gear 76, which rotates lower steering gear 82 in the same direction as the steering shaft, which rotates steering sleeve 84, which turns the king pin unit and thus the wheel one way. And, rotation of steering shaft 70 in the opposite direction from the first direction will turn the wheel the other way. The steering shafts 70 of each of the front wheels 12 and 14 are actuated from the vehicle steering wheel through hydraulic actuators (not shown) located in part in a drive brake and steering assembly 94 mounted in alignment with the road arm assembly upper gears and the suspension system 56.

Power transmission assembly 66 comprises a power transmission sleeve 96 mounted concentrically with steering shaft 70 and rotatable with respect thereto. The power sleeve is supported for rotation by sleeve bearings 98 and 100 and bearing assembly 102. An upper power gear 104 is affixed to power sleeve 96 and meshes with a middle power gear 106 that is mounted for rotation on stub shaft 78 by bearing 108. Middle power gear 106 also meshes with lower power gear 110, which is affixed to a power shaft 112 mounted concentrically with the road arm lower axis 54 and within steering sleeve 84.

The wheel hub 92 is connected to power shaft 112 through a universal joint 114 which both transmits power to the wheel and permits the steering assembly to turn the wheel about the king pin axis. The propulsive force is transmitted to the power transmission sleeves 96 from drive shafts 46 and 48 by a right angle gear-box located in drive, brake and steering assembly 94. Braking is accomplished by a caliper controlled by the vehicle brake pedal (not shown) acting on a disc mounted to the power transmission sleeve 96 within the drive, brake and steering assembly 94.

The king pin alignment assembly 68 includes an upper sleeve 116, a connector member 118 affixed thereto and an upper alignment gear 120 affixed to the connector. The upper sleeve, connector and upper gear are supported, as by bearing assembly 122 with respect to the road arm housing so that they remain stationary when the road arm is rotated.

Upper alignment gear 120 meshes with a middle alignment gear 126 that is rotatably mounted by a bearing 128 on stub shaft 78. The middle alignment gear also meshes with a lower alignment gear 130 that is mounted on a sleeve and king pin housing member 132. The sleeve and housing member is mounted for rotation within the road arm housing by bearing assemblies 134 and 136.

In operation, as the steering assembly shaft is rotated, upper alignment gear 120 remains stationary, allowing the middle alignment gear 126 to "walk around" it. This counter-rotates the lower alignment gear 130 and thus sleeve and housing member 132 an equivalent amount, which results in the attitude of the king pin being held constant with respect to the ground, assuring that the steering functions can be effected at all road arm positions without resorting to additional systems.

For structural purposes the road arm housing 62 includes an inner wall 138 having apertures 140, 142 and 144 therein. Bearing assembly 102 is mounted in aperture 140 and supports one end of power transmission sleeve 96. A bearing assembly 148 is mounted in aperture 144 and supports power shaft 112. The power shaft is also supported by a bearing assembly 150 located on the other side of lower power gear 110 from bearing assembly 148. A spacer member 152 is mounted on stub shaft 78 within aperture 142 and other spacer members are also mounted on the stub shaft 78 to locate the middle alignment, steering and power gears along the stub shaft.

Figure 5:
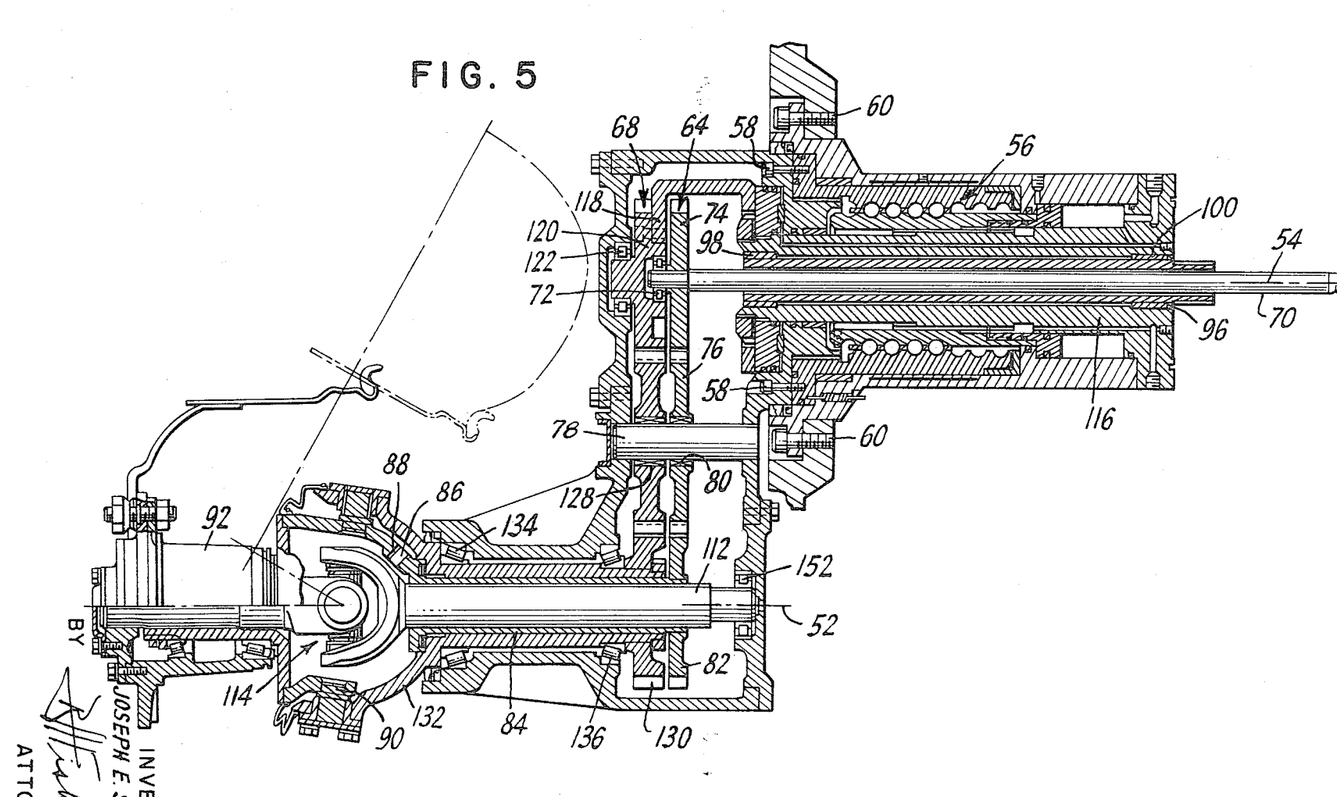
FIG. 5 is a side sectional elevation view of a steerable trailing road arm.

FIG. 5 shows a road arm system similar to that of FIG. 4 except that the sub-system for powering the wheel is omitted. This results in a steerable but not powered wheel such as those commonly utilized as the front wheels of rear-wheel drive. This configuration could also be used in various combinations of all terrain vehicles where it is desired to have all the wheels steerable but not necessarily to power all the wheels.

Figure 6:
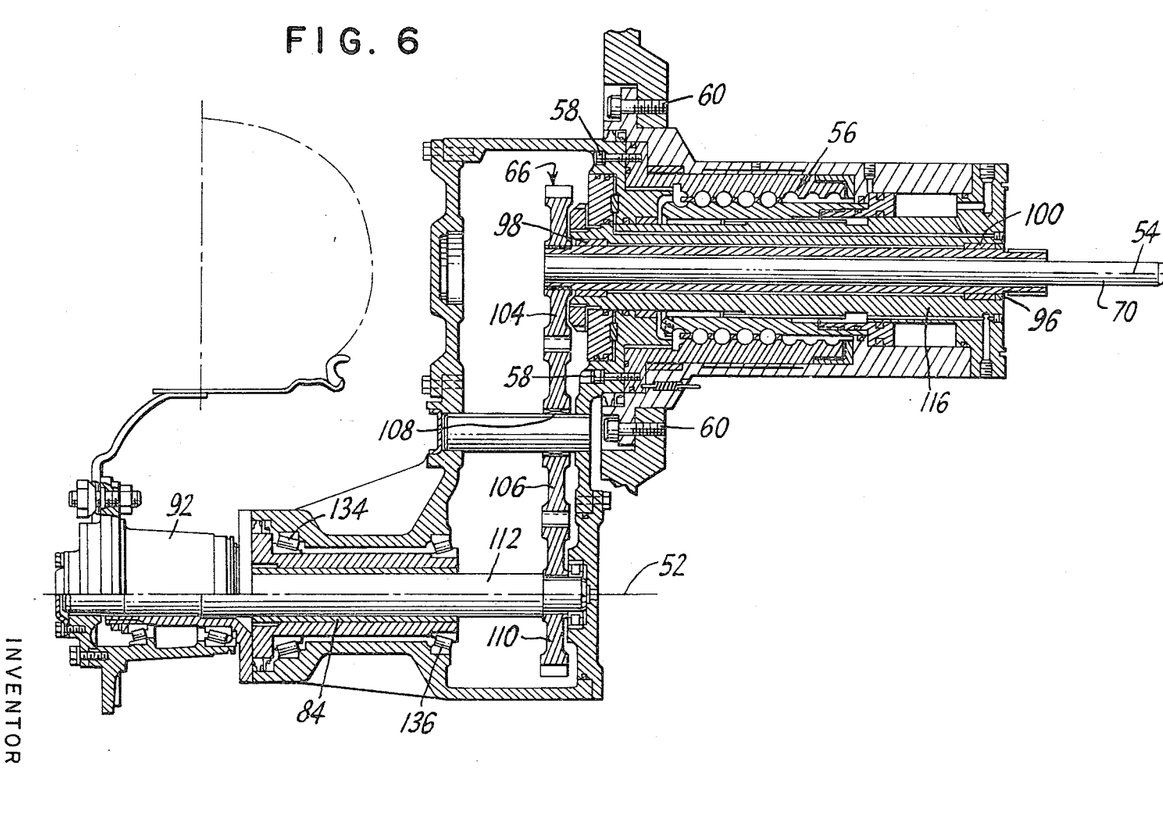
FIG. 6 is a side sectional view of the powered road arm.

FIG. 6 shows a road arm system wherein the wheel is powered but not steerable. In this configuration both the steering and king pin alignment sub-systems have been omitted. This configuration is for situations where it is necessary only to steer certain of a pluralities of wheels in a vehicle, but the traction of an all powered wheel vehicle is desired. This is the configuration used in the embodiment shown in FIGS. 1—3 on wheels 16, 18, 20 and 22.

Figure 7:
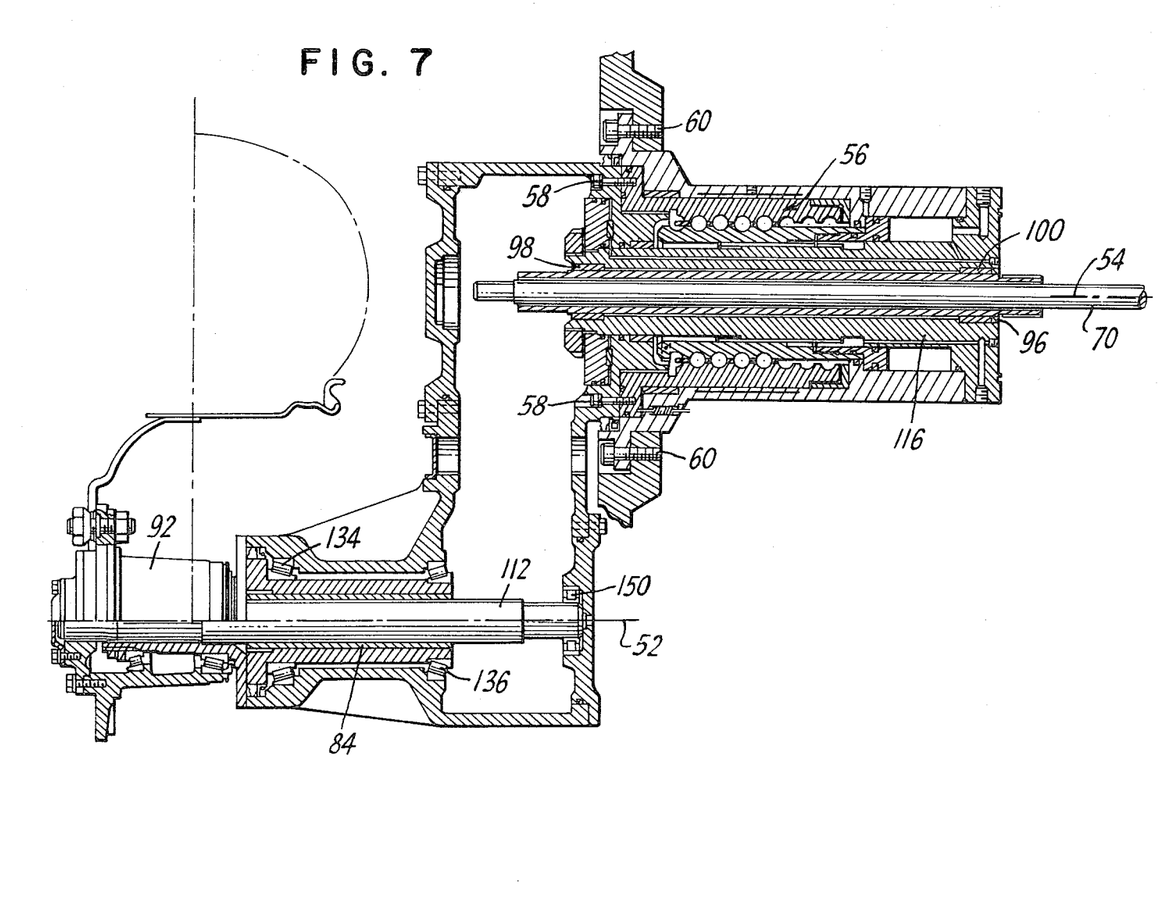
FIG. 7 is a side sectional view of an idler trailing road arm.

FIG. 7 shows merely an idler trailing road arm wherein the adaptability of a pivotable trailing road arm is desired for vehicle support and the power and steering functions are not required.

In all embodiments, the vehicle is controlled by current state of the art control systems leading from the drivers cabin to the location of the various road-arms. The road arms can be pivoted in a variety of ways but a hydraulic system would be most suited for the vehicle configuration shown in FIGS. 1—3.

The typical road arm position is that where the long axis of the road arm is rotated downwardly 30° from horizontal as shown in FIG. 3. In situations where it is desired to raise the vehicle, the road arm can be rotated such that its axis is an additional 50° below the horizontal, or almost vertical. In swimming modes the road arm may be rotated so that its axis is 55° above the horizontal at which position the wheels are entirely above the side frame of the vehicle and may be used to propel the vehicle through water.

It is not necessary to have all the wheels at the same attitude. For example, if a hill is being laterally traversed, the downhill wheels may be lowered with respect to the vehicle and the uphill wheels raised such that the vehicle and load are horizontal, despite the slanted roadway. This is to say that the road arms of the downhill wheels may be rotated so that the respective axes thereof are below the "horizontal," thus raising the downhill side of the vehicle, while the road arms of the uphill wheels may be rotated so that the respective axes thereof are above the "horizontal," whereby the vehicle and load may be oriented substantially horizontally.

Having now fully set forth both structure and operation of preferred embodiments of the concept underlying the present invention, it may be that various other embodiments as well as certain variations and modifications of the embodiments herein shown and described will occur to those skilled in the art upon becoming familiar with said underlying concept. All such embodiments, variations, and modifications as incorporate the spirit of the invention and depend upon its underlying concept are consequently to be considered as within the scope of the claims appended herebelow, unless the claims by their language expressly state otherwise.

I claim

1. In a vehicle having steerable wheels, apparatus for mounting the wheels on the vehicle, which comprises: a road arm assembly having first and second lateral axes, means mounting said road arm assembly to the vehicle at said first lateral axis, means for pivoting the road arm assembly about said first lateral axis, means for mounting a wheel at the second lateral axis, means for driving said wheel, and means for steering said wheel about a generally vertical axis, said steering means comprising rotatable means mounted along said second lateral axis, king pin means mounted along said generally vertical axis, means for pivoting said king pin means upon rotation of said rotatable means, and means for rotating said rotatable means.

2. Apparatus according to claim 1, wherein said means for rotating said rotatable means includes:
   rotatable means mounted along said first lateral axis, and
   means for rotating said rotatable means mounted along said second lateral axis from the rotatable means mounted along said first lateral axis.

3. In a vehicle having steerable wheels, apparatus for mounting the wheels on the vehicle, which comprise: a road arm assembly having first and second lateral axes, means mounting said road arm assembly to the vehicle at said first lateral axis, means for pivoting the road arm assembly about said first lateral axis, means for mounting a wheel at the second lateral axis, means for driving said wheel, means for steering said wheel about a generally vertical axis, and means for maintaining said generally vertical axis in a constant attitude as the road arm assembly is pivoted about said first lateral axis.

4. Apparatus according to claim 3, wherein said means for steering the wheel includes a king pin assembly and the means for maintaining said generally vertical axis in a constant attitude includes a housing generally enclosing said king pin assembly and means for pivoting said king pin housing an equal and opposite amount as the road arm assembly is pivoted.

5. Apparatus according to claim 4, wherein said means for pivoting said king pin housing includes:
   a sleeve portion extending from the king pin housing and mounted concentrically with said second lateral axis of the road arm assembly,
   stationary gear means mounted along the first lateral axis of the road arm assembly,
   gear means mounted on said sleeve portion in spaced relationship with said stationary gear means, and
   middle gear means meshing with both said stationary gear means and said gear means on said sleeve portion, said middle gear means rotating around said stationary gear means in response to road arm rotation and thereby rotating the sleeve portion in the opposite direction.

* * * * *